United States Patent Office 3,544,457
Patented Dec. 1, 1970

3,544,457
PROCESS AND APPARATUS FOR
FLUID TREATMENT
Fredrick T. Tulley and Berlin C. Harris, Jr., Baton Rouge, La., assignors to Ethyl Corporation, New York, N.Y., a corporation of Virginia
Filed Mar. 28, 1968, Ser. No. 716,908
Int. Cl. B01d 23/10, 39/04
U.S. Cl. 210—65                                9 Claims

ABSTRACT OF THE DISCLOSURE

A process and apparatus for removing solids from a liquid stream. The liquid is passed through a filter containing discrete particles of a plastic material having irregular, nonuniform shaped surfaces. The particles of plastic material may be supported on gravel or rocks or by other media. It is preferred that the plastic particles have a size from about 16 mesh to about 25 mesh. The preferred material for the plastic particles is polyvinyl chloride particles which have been formed by the suspension process. The filters are characterized by extremely high throughput and high clarity of the effluent liquid. The filters can be backwashed in the same manner as conventional sand filters.

BACKGROUND OF THE INVENTION

Field of the invention

This invention relates to a process and apparatus for the filtration of liquids; in particular a filtration unit utilizing discrete particles of a plastic material having irregular, nonuniform shaped surfaces.

Description of the prior art

Water and other liquid purification facilities have used for many years conventional sand packed filters for clarification of solid contaminated liquids. In particular municipal and industrial water treatment plants utilize large numbers of the conventional sand packed filters for clarifying surface water to render it suitable for further treatment in conversion to industrially and municipally usable water. Sand has been used as the water filtration medium primarily because of its ready availability, low cost, and reasonable life span. However, sand suffers from many disadvantages primarily the low throughput of liquid through the sand limits the amount of satisfactory effluent that can be obtained from sand filters. Additionally the sand filters require the installation of very heavy support structures and basin containers because of the extremely high density of the sand. While other materials have been used in filters in the form of discrete, divided particles, none have found ready acceptance by the public. Certain diatomaceous earths have been used for particular applications, however, the high cost of these materials and their short life have rendered them only mildly acceptable.

Thus there is a recognized need in the art for a process and apparatus for clarifying liquids wherein high flow rates can be obtained with high efficiency as to the removal of solid matter from the liquid.

SUMMARY OF THE INVENTION

It is an object of the present invention to provide process and apparatus for efficient filtration of solids from liquid streams.

It is a further object of the present invention to provide a process for clarifying liquids wherein high flow rates may be obtained through the filter media.

It is also an object of the present invention to provide an apparatus which is simple in construction and can be made of low cost materials for filtering large quantities of liquids.

It is a still further object of the present invention to provide a filtration media which can be installed in presently existing filter facilities.

The foregoing objects and other advantages that are brought out hereinafter are realized in the process aspects in a process for removing solids from a liquid which includes the step of passing the liquid through the bed of filter media which consist of discrete particles of a plastic material having irregular, nonuniform shaped surfaces.

The apparatus aspects of the present invention are realized in a plant for removing solids from liquid which includes a means for supporting a bed of filter media. The filter media includes discrete particles of a plastic material having irregular, nonuniform shaped surfaces. Means are provided for feeding the liquid to the top of the bed of the filter media and other means are provided for collecting the liquid at the bottom of the bed.

The process and apparatus of the present invention are characterized by the extremely high throughput of liquids through the filter made using discrete plastic particles versus that obtained using sand. Throughput for a conventional sand filled filter is about 2 to 3 gals./min. per square foot of filter area. Throughput for the apparatus of the present invention using discrete, irregular, nonuniform shaped plastic particles from about 16 to about 25 mesh is about 12 to 16 gals./min. per square foot. Additionally the process and apparatus of the present invention provides a filtration system wherein one can obtain an effluent with about 0.2 p.p.m. turbidity by 6 cycles at a rate of about 15 to 16 gals./min. per square foot as opposed to 230 cycles to obtain the same turbidity when using the same flow rate on a filter containing the conventional size sand particles.

DESCRIPTION OF THE PREFERRED EMBODIMENT

Figure 1:
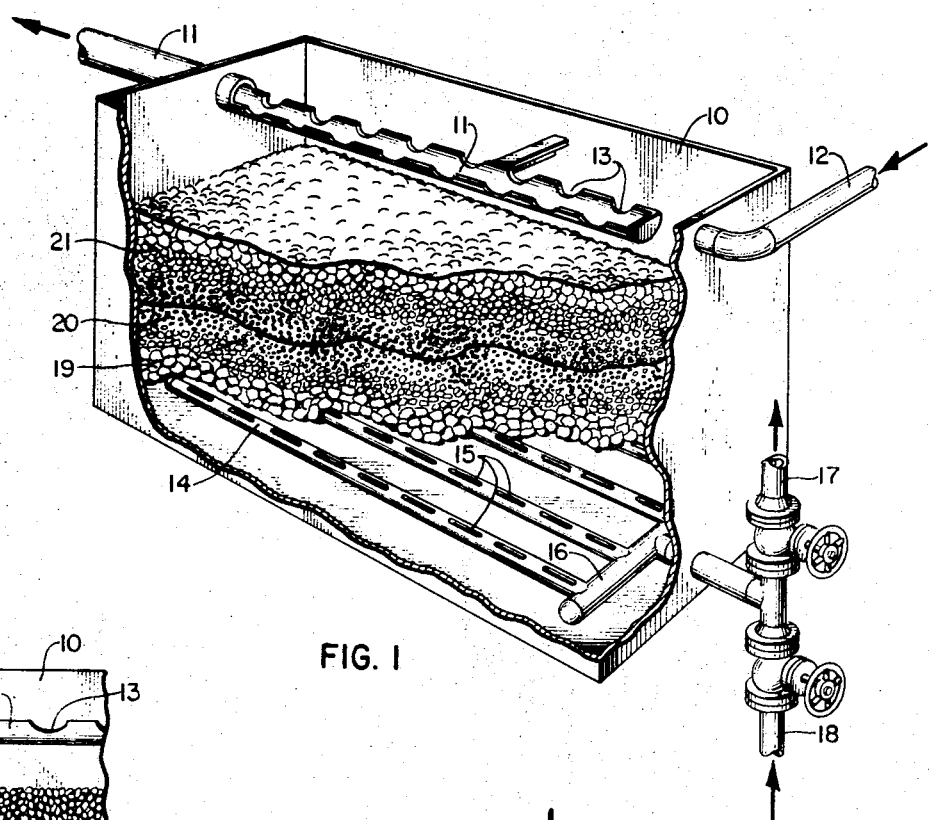
FIG. 1 is a filtration apparatus containing discrete particles of a plastic material having irregular, nonuniform shaped surfaces.

Referring now to FIG. 1 it will be seen that the filter material is contained within vessel 10 which may be a large masonry structure or concrete structure if used for municipal or industrial large volume water treatment. However, it is understood that the vessel containing the filter medium may be small, i.e., 2, 3, 5 gallon capacity and made of metal or plastic depending upon the service for which the filter is intended. The liquid may be passed through the filter under pressure if desired. Vessel 10 is provided with a liquid inlet line 12 carrying the fluid to be treated. In the bottom of the vessel 10 there is provided a plurality of gathering lines 14 for collection of the filtered liquid from the bottom of the vessel. Each collection line 14 is provided with a plurality of slots or openings 15 to admit the treated liquids to the interior of the line. A header 16 ties the plurality of lines 14 together and conveys the liquid to the discharge line 17. A backwash line 18 is connected into a pipe tee at the bottom of the vessel to provide backwash water for clarifying and removing the sludge from the top of the filter bed. A trough 11 having weir slots 13 carries away the backwash liquid and solids. Immediately on the top of the collection line 14 is a plurality of large rocks 19 and on top of that is placed a layer of smaller size pebbles 20. Immediately above the pebbles 20 is a layer of discrete, irregular, nonuniform shaped plastic material 21. This plastic filter media as shown in FIG. 1 has a graded size, the largest particles being on the top and the smaller particles being on the bottom layers.

Figure 2:
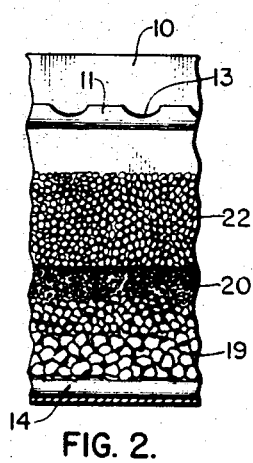
FIG. 2 is a filtration apparatus similar to that shown in FIG. 1 with the exception that all of the plastic particles are substantially the same size.

As shown in FIG. 2 the vessel 10 contains rocks 19 and pebbles 20 and a layer of plastic filter media 22 wherein the particle size of the filter media is substantially the same. Sometimes it is desirable to provide a filter having all particles of the same size.

Figure 3:
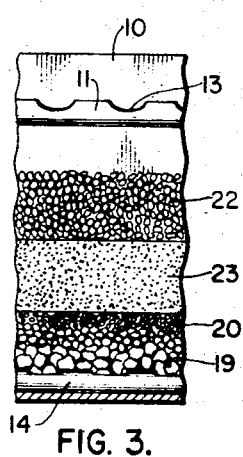
FIG. 3 is a filtration apparatus similar to that shown in FIG. 1 with the exception that the plastic particles are used co-jointly with a layer of sand in the filter.

FIG. 3 shows another embodiment of the present invention wherein the vessel 10 contains a first layer of rocks 19 as a layer of pebbles 20 and above this layer of pebbles is provided a small layer of sand particles 23. Above the sand particles is the filter media 24 composed of a layer of discrete particles of a plastic material having an irregular, nonuniform shaped surface.

Figure 4:
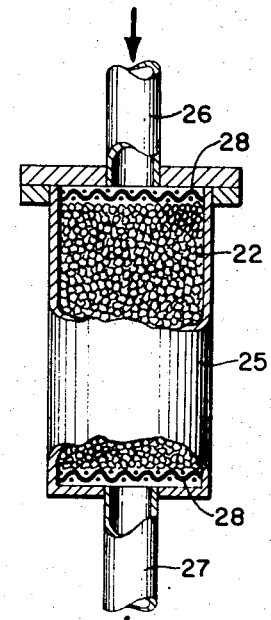
FIG. 4 is a small inline pressure filter.

If desired it is possible to replace the intermediate layer of sand as shown in FIG. 3 with a layer of anthracite coal of the proper particle size. Further if desired the sand layer 23 may be present and an additional layer of anthracite coal may be provided between the sand and the top layer of plastic filter media 24. As seen in FIG. 4 the filter may include a closed vessel 25 having a fluid inlet line 26 at one end and a fluid outlet line 27 at the other end. A pair of wire mesh screens 28, one at each end, retains the plastic filter media particles 22 within the body of the vessel. The plastic filter media 21, 22 and 24 may be any suitable plastic material having properties which render it abrasion resistant and inert to water treatment chemicals and other liquid materials which may be passed through the filter bed. It is understood that the nature of the plastic material used for forming the filter media will be dictated by the characteristics of the liquid stream being passed through the filter bed. The process and apparatus of the present invention is particularly suited for the filtration of water, however the invention is not limited to filtration of this material. The present invention may be used to purify waste streams from industrial processes such as paper mill waste streams. Additionally the filters may be utilized to clarify continuously recirculated streams such as home and commercial swimming pool streams.

It is preferred that the plastic particles used to fill the filter of the present invention have a particle size which will be fairly evenly distributed between about 10 mesh and about 60 mesh particle size. However, for some services the particle size should range from about 16 to about 40 mesh. In particularly critical filtration areas it has been found that the particle size for most efficient filtration should range from about 16 to about 25 mesh. In physical dimension the particles should have a maximum dimension of from about 2 millimeters to about 10 millimeters, preferably from about 4 to about 8 millimeters. The plastic filter media should be placed on a rock and pebble bed of about twenty inches when used for industrial and municipal water filtration. It has been found that about twenty inches of plastic material filter media on top of the rock and pebble bed is satisfactory. However, other depths of support and filter media will be found suitable depending upon the configuration of the filter vessel and the throughput of liquid over the filter. The pebble and rock support should range from a minimum size of about 1 millimeter up to about 2½ inches in diameter maximum. However, it is not essential that rocks and pebbles be utilized to support the plastic filter media since it can be supported on fine mesh wire screen or other suitable material which will retain the plastic filter media within the treatment vessel.

The plastic material chosen for the filter media may be any plastic material, synthetic or natural, which has the requisite physical properties for the service in which the filter is utilized. The plastic filter media may be selected from thermoplastics and thermosetting plastics. Examples of suitable plastic materials are polyolefins, polyvinyl halides, polyacrylates, polyacrylonitriles, polyamides, polycarbonates, poly esters, polyoxymethylenes, polymethacrylates, polystyrenes, polyurethanes, melamine-formaldehyde resins, phenol-formaldehyde resins and urea-formaldehyde resins. Additionally other plastic materials may be utilized for this service. Examples of suitable polyolefins are polyethylene, chlorinated polyethylene, polypropylene, polybutenes, and poly 4-methyl pentene-1. Examples of suitable polyvinyl halides are polyvinyl fluoride, polyvinyl chloride, polyvinyl bromide, polyvinylidene chloride, polytetrafluoroethylene, and polychlorotrifluoroethylene. Examples of suitable polyacrylates are polymethyl acrylate, polyethyl acrylate, polymethyl methacrylate, poly-allyl methacrylate, polycyclohexyl methacrylate. Examples of suitable polyamides and nylon 66 (hexamethylenediamine:adipic acid polymer), nylon 610 (hexamethylenediamine:sebacic acid polymer), nylon 6 (caprolactam polymer), and nylon 11 (amino undecanoic acid polymer). An example of a suitable polycarbonate is the bisphenol A:phosgene polymer (Lexan). Examples of suitable polyesters are terephthalic acid:ethylene glycol polymer and ethylene glycol:phthalic anhydride:styrene terpolymer. Examples of suitable polyoxymethylenes are polyformaldehyde, trioxane polymers, vinyl ether:trioxane copolymer and norbornylene: trioxane copolymer. Examples of suitable polystyrenes are polystyrene, polychlorostyrene, polyvinyl styrene, polybromo styrene. Examples of suitable polyurethanes are toluene diisocyanate:tetramethylene glycol polymer, and hexamethylene diisocyanate:tetramethylene glycol polymer. Examples of suitable thermosetting plastics are the melamine-formaldehyde resins, phenol-formaldehyde resins, and urea-formaldehyde resins.

One of the most preferred plastic materials for forming the plastic media used in the filter of the present invention is polyvinyl chloride. The polyvinyl chloride may be prepared by either the emulsion, bulk or suspension process. It has been found that when polyvinyl chloride is prepared by the emulsion process disclosed in U.S. Pat. 2,843,576 that there is provided a granular porous, polyvinyl chloride in aggregate form which has a particle size eminently suitable for use in the present filter. Under proper conditions of concentration of an emulsifying agent the procedure set forth in the foregoing patent can yield a vinyl chloride having a particle size within the desired 16 to 40 mesh with a very high percentage being in the 16 to 25 mesh range. The bulk density of the polyvinyl chloride should be from about 20 lbs./cubic foot to about 60 lbs./cubic foot. These particles of polyvinyl chloride are characterized by an extremely high surface area per unit volume and an extremely irregular configuration for surface. The polymer has a "popcorn" appearance characterizing a high surface area and a low density because of its porosity. Another suitable commercially available polyvinyl chloride is Ethyl SR225 PVC resin may by a supension process.

The invention is not limited to polyvinyl chloride or any other plastic prepared by a suspension or any other polymerization process but may utilize plastic particles which have been prepared by grinding or serrating or cutting solid plastic material having the proper physical properties. However, it is preferred that the plastic media utilized in the present invention have a relatively large surface area and an irregular exterior surface in order to provide high void space and minimize the packing of the plastic particles.

In a test unit constructed utilizing as the plastic filter media polyvinyl chloride particles prepared by a suspension process (Ethyl SR225 PVC resin) having a particle size of from about 16 to about 40 mesh extremely high efficiencies were realized. In a test unit containing about one cubic foot of filter media using river water which had been treated by standard flocculating treatments and chlorined prior to introduction into the filter, it was found that a rate of 15 to 16 gals./min. per square foot could be passed through the filter and that the effluent water would have a turbidity of 0.2 p.p.m. after only 6 cycles through the filter bed. In a like size filter utilizing sand in place of the polyvinyl chloride particles it required 230 passes at the same flow rate through the sand before the turbidity reached the 0.2 p.p.m. level. Thus is is seen from the foregoing that extremely high filtration rates can be obtained with very good turbidity levels using the process and apparatus of the present invention. The filters of the present invention may be backwashed as shown in FIGS. 1, 2, and 3 after the initial filtration level drops off (e.g. 20 percent drop) using treated backwash water or other liquid to remove the sludge and dirt and accumulated solid matter from the top two or three inches of the plastic filter media. Conventional techniques are well known to those skilled in the art for backwashing and purifying a particulate filter bed. The process and apparatus of the present invention is characterized in that is can maintain high flow rates for a longer period of time without necessity of backwashing. Additionally the random shaped plastic filter media provides a much less turbid effluent at a much higher flow rate than does the conventional sand filter beds.

What is claimed is:

1. In a process for removing solids from a liquid wherein said liquid is passed through a bed of filter media consisting of discrete polyvinyl chloride particles, the improvement comprising passing said liquid over polyvinyl chloride particles having irregular, nonuniform shaped surfaces and a particle size of from about 10 mesh to about 60 mesh.

2. The process of claim 1 wherein said polyvinyl chloride particles are produced by either the emulsion, bulk or suspension polymerization process.

3. The process of claim 1 wherein said polyvinyl chloride particles have a bulk density of from about 20 pounds per cubic foot to about 60 pounds per cubic foot.

4. The process of claim 1 wherein a throughput of about 12 to 16 gallons of liquids per minute per square foot is obtained.

5. In an apparatus for removing solids from a liquid stream the combination comprising: means for supporting a bed of filter media, said filter media consisting of discrete, irregular polyvinyl chloride particles having nonuniform shaped surfaces and a particle size of from about 10 mesh to about 60 mesh; means to feed a liquid to the top of said bed of filter media; and means to collect said liquid at the bottom of said bed.

6. The apparatus of claim 5 wherein the filter media has a throughput of about 12 to 16 gallons of liquids per minute per square foot.

7. The apparatus of claim 5 wherein said polyvinyl chloride particles are formed by a suspension polymerization process.

8. In the process of claim 1 wherein said particles have a size of from about 16 mesh to about 25 mesh.

9. In the apparatus of claim 5 wherein the particles have a size of from about 16 mesh to about 25 mesh.

References Cited

UNITED STATES PATENTS

| | | | |
|---|---|---|---|
| 2,057,237 | 10/1936 | Hoop | 210—290 X |
| 2,101,961 | 12/1937 | Slidell | 210—290 |
| 3,293,174 | 12/1966 | Robjohns | 261—94 |
| 3,298,521 | 1/1967 | McKinlay | 210—290 X |
| 3,327,859 | 6/1967 | Pall | 210—500 UX |
| 3,352,778 | 11/1967 | Brink et al. | 210—23 |
| 3,382,983 | 5/1968 | Stewart | 210—290 X |

FOREIGN PATENTS 133,784   8/1949   Australia.

JAMES L. DeCESARE, Primary Examiner

U.S. Cl. X.R.

210—290, 500